United States Patent
Reece

(10) Patent No.: US 7,691,075 B1
(45) Date of Patent: Apr. 6, 2010

(54) APPARATUS AND METHOD FOR MINIMIZING ARM FATIGUE OF A VIDEOGRAPHER

(76) Inventor: Timothy Reece, 17044 Lassen St., Northridge, CA (US) 91325

( * ) Notice: Subject to any disclaimer, the term of this patent is extended or adjusted under 35 U.S.C. 154(b) by 87 days.

(21) Appl. No.: 11/843,050

(22) Filed: Aug. 22, 2007

Related U.S. Application Data

(60) Provisional application No. 60/823,924, filed on Aug. 30, 2006.

(51) Int. Cl.
*A61F 5/00* (2006.01)
(52) U.S. Cl. .......................... 602/20; 602/21
(58) Field of Classification Search ............ 602/4–5, 602/20–21; 248/118, 118.3; 224/258, 908
See application file for complete search history.

(56) References Cited

U.S. PATENT DOCUMENTS

| | | | |
|---|---|---|---|
| 5,111,983 A * | 5/1992 | Simmons et al. ............ 224/258 |
| 5,522,573 A * | 6/1996 | Xiao ........................... 248/118 |
| 5,692,713 A | 12/1997 | Xiao |
| 5,784,820 A | 7/1998 | Wood |
| 5,819,461 A | 10/1998 | Killian |
| 6,082,034 A | 7/2000 | Musmanno |
| 6,789,344 B2 | 9/2004 | Cain |
| 6,829,856 B1 | 12/2004 | Moorman |
| 2002/0134896 A1 | 9/2002 | Hunter |

* cited by examiner

*Primary Examiner*—Michael A. Brown
(74) *Attorney, Agent, or Firm*—Philip A Steiner

(57) ABSTRACT

The arm support bridge 11 is then uniformly bent outward away from the common lateral plane of the main panel 10 by applying a thermal press to the arm support bridge 11. The arm support bridge 11 is bent outward at acute angle of 20 to 40 degrees relative to the common lateral plane of the main panel 5 such that the underarm support 13 is disposed anterior of a longitudinal centerline of the main panel 5 and cantilevered from the main panel 10 with the arm support bridge 11.

22 Claims, 5 Drawing Sheets

APPARATUS AND METHOD FOR MINIMIZING ARM FATIGUE OF A VIDEOGRAPHER

CROSS-REFERENCE TO RELATED APPLICATIONS

This non-provisional application claims priority under 35 USC 119(e) to the instant inventor's co-pending provisional patent application 60/823,924 filed on Aug. 30, 2006. The aforementioned provisional application is herein incorporated by reference in its entirety as if fully set forth herein.

FEDERALLY SPONSORED RESEARCH AND DEVELOPMENT

Not Applicable

REFERENCE TO A MICROFICHE APPENDIX

Not Applicable

FIELD OF INVENTION

Embodiments of the present invention generally relate to videography accessories and more specifically to an apparatus and method of use for an arm support device.

BACKGROUND

Video cameras are known in the relevant art for recording a variety of dynamic scenes, etc. The video cameras, commonly known as camcorders, have been reduced in size and weight dramatically over recent years adding considerable battery life and recording capacity. However, regardless of the size or weight of the camcorder, the videographer is still subject to arm fatigue while attempting to maintain a camcorder in a fixed position over an extended period of time. With the increased battery life and recording capacity of the newer camcorders, the ability of the videographer to maintain a fixed position may become a limiting factor, for example, while recording lengthy events such as weddings, political speeches, school or theatrical presentations, sporting events, etc. As such, a lightweight and low cost arm support apparatus would be advantageous to assist the videographer in recording longer duration events and providing a generally stable platform to perform the video recording.

SUMMARY

Various exemplary embodiments of the invention as described herein addresses the desirable aspects lacking in the relevant art, particularly a lightweight and low cost arm support for use by a videographer. In a first exemplary apparatus embodiment, a support apparatus for minimizing arm fatigue of a videographer is provided. This exemplary embodiment comprises a main panel having a hyoid contour sufficient to laterally encompass a portion of a torso of the videographer; an arm support bridge being contiguous with an upper edge of the main panel and projecting laterally outward from the main panel in a plane generally perpendicular to the main panel. The arm support bridge includes a downward sloping underarm support contiguous with the arm support bridge. The underarm support is aligned at an acute angle relative to the main panel and disposed predominately anterior of a longitudinal centerline of the main panel.

In a first related exemplary embodiment, the underarm support includes a concave cross sectional profile which generally conforms to a contour of a portion of the videographer's upper arm to be supported thereon.

In a second related exemplary embodiment, the arm support bridge includes at least one strap to circumferentially maintain a portion of the videographer's upper arm in a generally parallel alignment with a long axis of the underarm support.

In a third related exemplary embodiment, the main panel further includes an anterior projecting front panel contiguous with the main panel at least along a bottom edge and aligned at an acute angle relative to the torso of the videographer.

In a fourth related exemplary embodiment, the front panel is dimensioned such that a lateral portion of the torso below the underarm support is not encompassed by the main panel.

In a fifth related exemplary embodiment, the main panel is formed from a planar polymeric sheet.

In a sixth related exemplary embodiment, the underarm support is aligned such that a portion of the videographer's upper arm rests generally upon and in parallel with a long dimension of the underarm support in a generally anterior position relative to the torso of the videographer.

In a seventh related exemplary embodiment, the underarm support includes a generally rectangular shape having a long axis aligned in about an anterior to posterior arrangement and is offset from the longitudinal centerline of the main panel by the acute angle.

In an eighth related exemplary embodiment, the apparatus further including means for maintaining a portion of the videographer's upper arm in a generally parallel alignment with a long axis of the underarm support.

In a first exemplary methodic embodiment, a method is provided for minimizing arm fatigue of a videographer. This first exemplary methodic embodiment comprises;

positioning a main panel having a hyoid contour about a lateral surface of the videographer's torso such that an arm support bridge contiguous with an upper edge of the main panel is positioned predominately anterior of a longitudinal centerline of the main panel;

placing a portion of the videographer's upper arm in a generally parallel alignment with a long axis of an underarm support projecting laterally outward from the main panel in a plane generally perpendicular to the main panel; and, maintaining the portion of the videographer's upper arm in the generally parallel alignment with the long axis of the underarm support by circumferentially placing one or more straps about the videographer's upper arm.

In a first related exemplary methodic embodiment, the method further includes adjusting the position of the main panel to allow video recording for an extended time period when the videographer's upper arm is circumferentially maintained upon the underarm support.

In a second exemplary methodic embodiment, a method is provided for minimizing arm fatigue of a videographer. This second exemplary methodic embodiment comprises;

providing a main panel having a hyoid contour sufficient to laterally encompass a portion of a torso of the videographer;

providing an arm support bridge contiguous with an upper edge of the main panel and projecting laterally outward from the main panel in a plane generally perpendicular to the main panel; the arm support bridge including; and, providing a downward sloping underarm support contiguous with the arm support bridge and aligned at an acute angle relative to the main panel and disposed predominately anterior of a longitudinal centerline of the main panel.

In a first related exemplary methodic embodiment, the method further includes providing the underarm support with a concave cross sectional profile which generally conforms to a contour of a portion of the videographer's upper arm to be supported thereon.

In a second related exemplary methodic embodiment, the method further includes providing the arm support bridge with at least one strap to circumferentially maintain a portion of the videographer's upper arm in a generally parallel alignment with a long axis of the underarm support.

In a fourth related exemplary methodic embodiment, the method further includes providing a anterior projecting front panel contiguous with the main panel at least along a bottom edge which is aligned at an acute angle relative to the torso of the videographer.

In a fifth related exemplary methodic embodiment, the method further includes aligning the underarm support such that a portion of the videographer's upper arm rests generally upon and in parallel with a long dimension of the underarm support in a generally anterior position relative to the torso of the videographer.

In a sixth related exemplary methodic embodiment, the method further includes dimensioning the front panel such that a lateral portion of the torso below the underarm support is not encompassed by the main panel.

In a seventh related exemplary methodic embodiment, the method further includes providing means for maintaining a portion of the videographer's upper arm in a generally parallel alignment with a long axis of the underarm support.

In an eighth related exemplary methodic embodiment, the means for maintaining the portion of the videographer's upper arm is at least one strap.

BRIEF DESCRIPTION OF THE DRAWINGS

The features and advantages will become apparent from the following detailed description when considered in conjunction with the accompanying drawings. Where possible, the same reference numerals and characters are used to denote like features, elements, components or portions. It is intended that changes and modifications can be made to the described exemplary embodiments without departing from the true scope and spirit of the subject invention.

DETAILED DESCRIPTION

Figure 1:
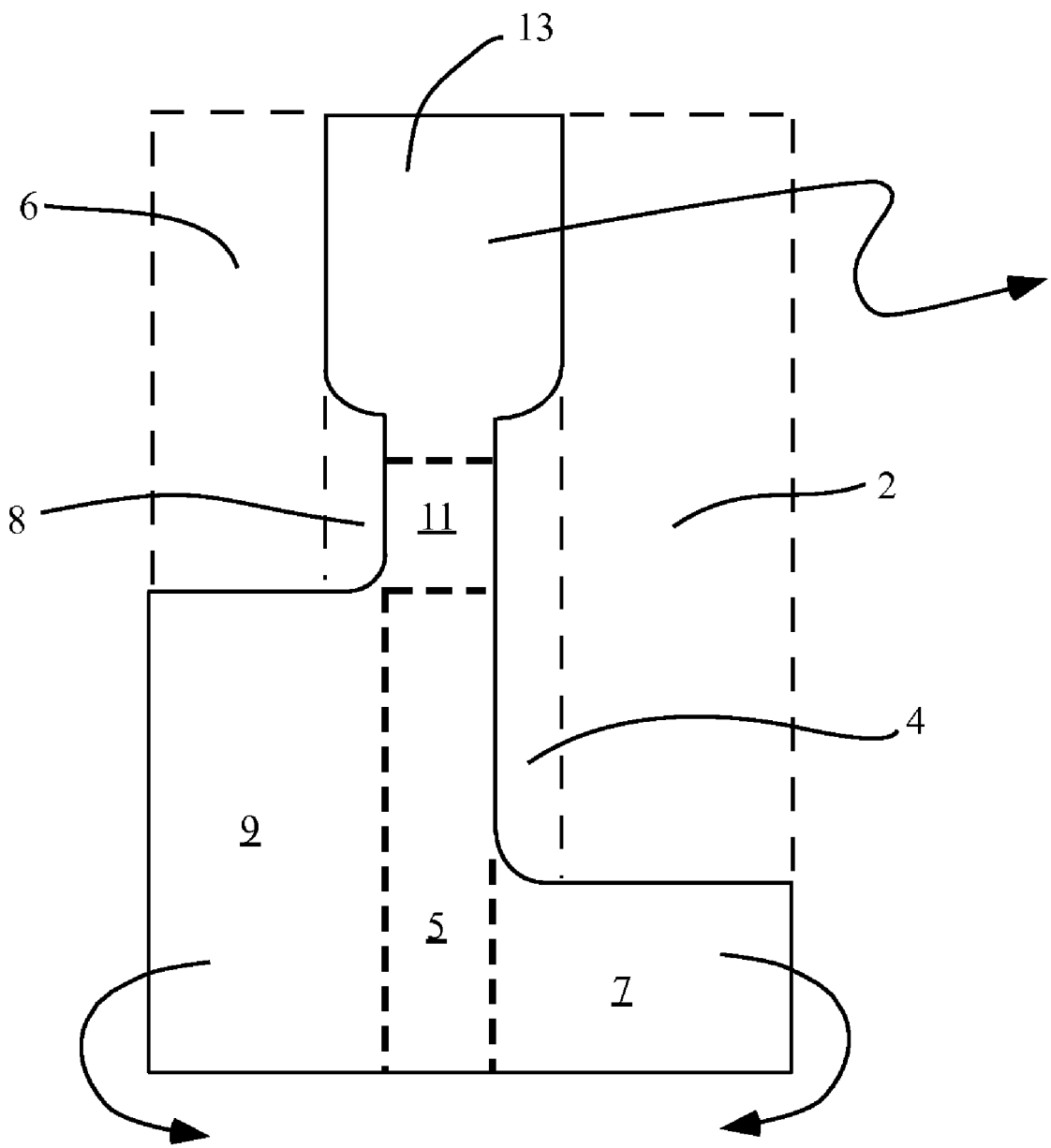
FIG. 1—depicts an embodiment where the support apparatus is cut from an elongated polymeric sheet.

Referring to FIG. 1, an arm support is formed from a generally rectangular sheet of plastic having approximate dimensions of 16 inches in length by 11 inches in width. Any moderately rigid polymeric plastic having a thickness of approximately 0.25 inches or greater will suffice; for example, Plexiglas (™.) The thickness of the plastic sheet should be selected to provide sufficient strength to support the combined weight of the videographer's arm and a camcorder held by the videographer by this same arm. The term videographer as used herein is intended to include a photographer as well. One skilled in the art will appreciate that the support apparatus can be used for both videography and still photography.

In this first embodiment, the long dimension of the plastic sheet is sized to fit between the underside of the arm and a hip of the videographer. This dimension is not particularly critical as the main panel of the arm support may be maintained against a side of the videographer rather than on a hip.

Depending on the intended handedness (left or right-handed) of the videographer, the support apparatus may be constructed from an elongated plastic sheet by cutting a first 16 inch by 4 inch rectangular section 2 from the plastic sheet. For convenience, the more common right-handed version of the arm support is described. One skilled in the art will appreciate that a left handed version may be constructed by generating a mirror image of the right-handed version of the support apparatus.

The first cut begins on the right lateral edge of the plastic sheet at a position of about 3 inches above the main panel 5 of the plastic sheet in the long dimension to about 16 inches above the main panel 5 of the plastic sheet (i.e., the long dimension of the support apparatus.)

The width of the rectangular section to be cut away 2 from the support apparatus is about 4 inches. The first cutaway rectangular section 2 may be recycled or discarded as appropriate.

A second rectangular section 4 having dimensions of about 8 inches in length by 0.5 inches in width is then cut from the remaining right lateral side of the support apparatus. This second rectangular section 4 extends the initial 4 inch width cut by an additional 0.5 inch and projects longitudinally from about 3 inches from the based of the main panel 5 to about 11 inches longitudinally from the base of the main panel 5. The cutaway second rectangular section 4 may likewise be recycled or discarded as appropriate.

A third rectangular section 6 having dimensions of about 8 inches in length by 4 inches in width is then cut from the left lateral side of what will be come the back panel 9. This third rectangular section 6 begins on the left lateral side at about 8 inches above the back panel 9 and extends longitudinally to about 16 inches above the base of the back panel 9. This third cutaway rectangular section 6 may likewise be recycled or discarded as appropriate.

A fourth rectangular section 8 having dimensions of about 3 inches in length by 0.5 inches in width may then be cut from the left lateral side of the back panel 9. This fourth rectangular section 8 extends the earlier 4 inch lateral cut made on the left lateral side by an additional 0.5 inch and projects longitudinally from about 8 inches from the base of the back panel 9 to about 11 inches from the back panel 9. This cutaway fourth rectangular section 8 may likewise be recycled or discarded as appropriate.

The remaining narrow rectangular portion of the main panel forms the arm support bridge 11 which provides continuity between the main panel 5 and an underarm support 13. The arm support bridge 11 also provides a bendable region in which the underarm support 13 may be properly aligned to comfortably receive the underarm of the videographer. The underarm support 13 has approximate dimensions of 6 inches in length by 4 inches in width. The actual dimensions of the underarm support 13 may be varied to accommodate smaller or larger arm circumferences as appropriate.

To form the completed support apparatus, the left lateral edge of the back panel 9 is bent uniformly inward away from a common lateral plane of the main panel 5 by applying a thermal press to the back panel 9 such that the back panel 9 is bent away from the common horizontal plane of the main panel 5 by an acute angle in a range of 20 to 40 degrees. Analogously, the front panel 7 is bent uniformly inward away from the common horizontal plane of the main panel 5 by applying the thermal press to the front panel 5 such that the front panel 5 is bent away from the common lateral plane of the main panel 5 by an acute angle in a range of 20 to 40 degrees. When completed, the combined front and rear panels 7, 9 forms a generally concave surface which is intended to approximate a contour of a side of the videographer.

The arm support bridge 11 is then uniformly bent outward away from the common lateral plane of the main panel 10 by applying a thermal press to the arm support bridge 11. The arm support bridge 11 is bent outward at acute angle of 20 to 40 degrees relative to the common lateral plane of the main panel 5 such that the underarm support 13 is disposed anterior of a longitudinal centerline of the main panel 5.

Once the arm support bridge 11 has been bent to the desired acute angle, the arm support bridge 11 is then bent downward at an acute angle of 20 to 40 degrees relative to a lateral plane of the main panel 5. In a related embodiment, the underarm support 13 may be formed into a concave surface which is intended to approximate a contour the underside of the videographer's upper arm.

Figure 2:
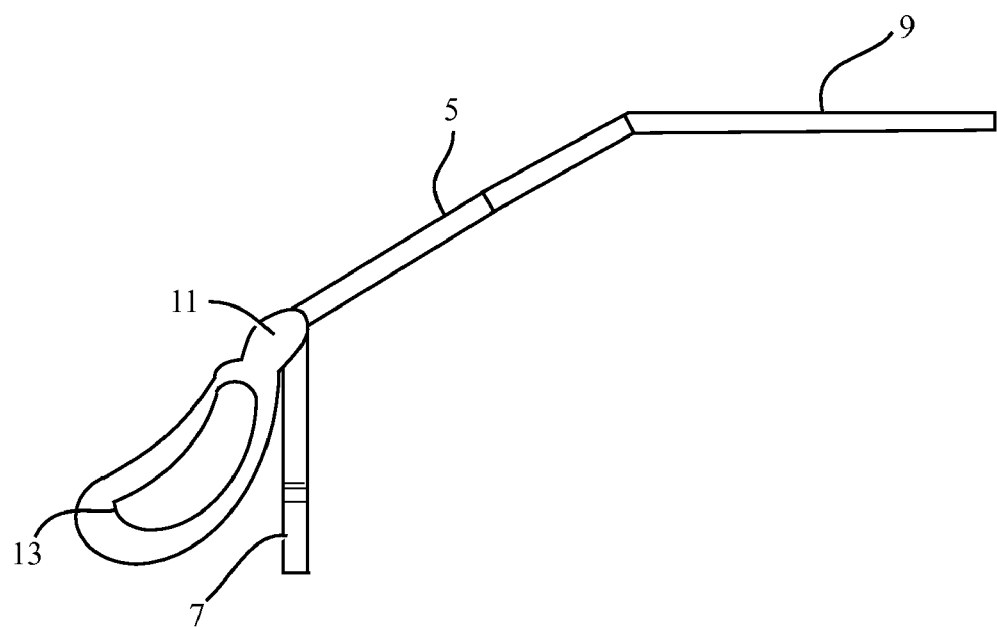
FIG. 2—depicts a top view of an embodiment of the support apparatus.

Referring to FIG. 2, a top view of an embodiment of the support apparatus is depicted. The support apparatus is divided into three panels including the rear panel 9, the main panel 5 and the front panel 7. The underarm support 13 is contiguously attached to a top edge of the main panel 5 by the arm support bridge 11. The thin sheet nature of the support apparatus allows for simple production from low cost polymeric materials. Alternate embodiments are envisioned in which the rear, main and front panels 9, 5, 7 are encompassed in a fabric such as canvas, Tyvek (™), Kevlar (™), nylon or polypropylene sheets which are sewn over the semi rigid planar sections such as cardboard, resilient plastic, or like synthetic materials.

Figure 3:
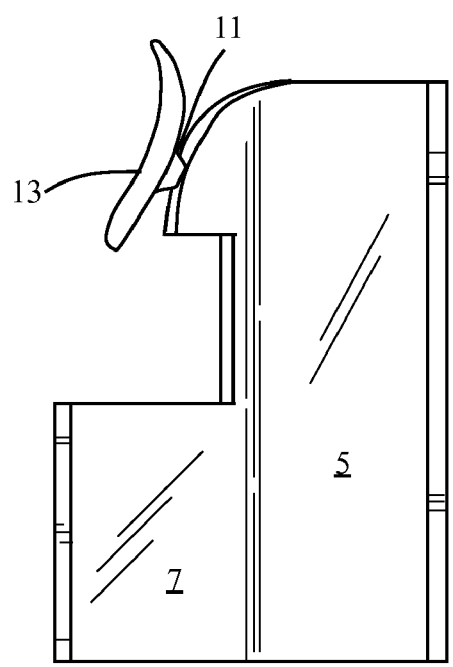
FIG. 3—depicts a front view of an embodiment of the support apparatus.

Referring to FIG. 3, a front view of an embodiment of the support apparatus is depicted. This front view illustrates the general relationship of the front panel 7 to the main panel 5 and the underarm support 13. The unitary construction of the support apparatus is likewise depicted.

Figure 4:
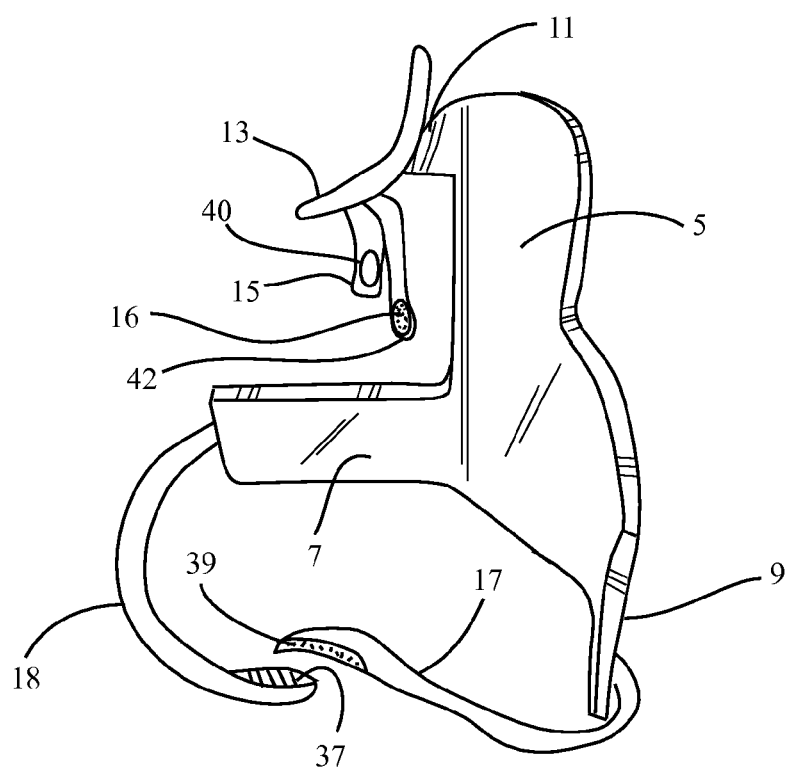
FIG. 4—depicts a perspective view of an embodiment of the support apparatus.

Referring to FIG. 4, a frontal view of an embodiment of the support apparatus is depicted which illustrates the general relationship of the front panel 7 to the main panel 5, back panel 9 and the underarm support 13. The hyoid interior contour of the support apparatus is likewise depicted.

Figure 5:
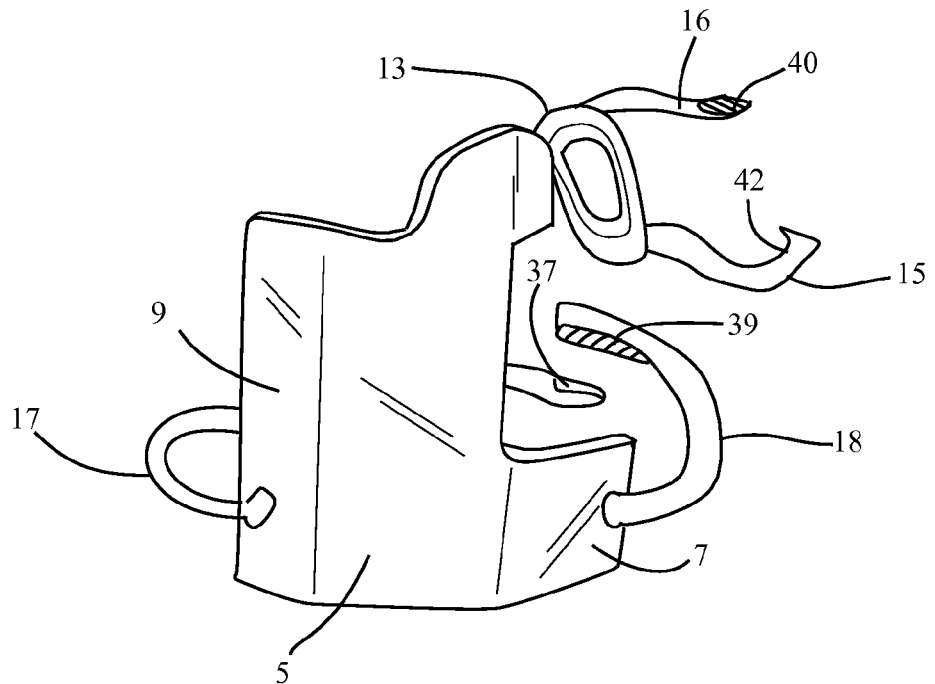
FIG. 5—depicts a rear view of an embodiment of the support apparatus.

Referring to FIG. 5, a rear view of an embodiment of the support apparatus is depicted which illustrates the general relationship of the rear panel 9 to the main panel 5, front panel 7 and the underarm support 13. The hyoid exterior contour of the support apparatus is likewise depicted. As previously discussed, one or more straps 15 of a sufficient length to circumferentially encompass the upper arm of the videographer are then attached to the underarm support generally in parallel with the lateral axis of the underarm support. The straps 15, 16 may be made from leather, nylon, elastic or other suitable materials.

In another related embodiment, one or more additional straps 17, 18 (FIGS. 6 and 7) may be provided which laterally and circumferentially encompasses the torso of the videographer, such that the main panel 5 is maintained along a side of the videographer's torso. These straps 17, 18 may be made from leather, nylon, elastic or other suitable materials. The straps 17, 18 are attached to a rearward edge of the back panel 9 and a forward edge of front panel 7. In yet another related embodiment, the corners associated with the underarm support 13, back panel 9, main panel 5 and front panel 7 may be rounded using an abrasive to minimize pointed or sharp edges.

In a second embodiment, the support apparatus is formed using an injection molding process which eliminates the cutting and bending processes described above. As previously discussed, a polymer which forms a relatively rigid structure may be injected into the mold to produce the support apparatus.

Figure 6:
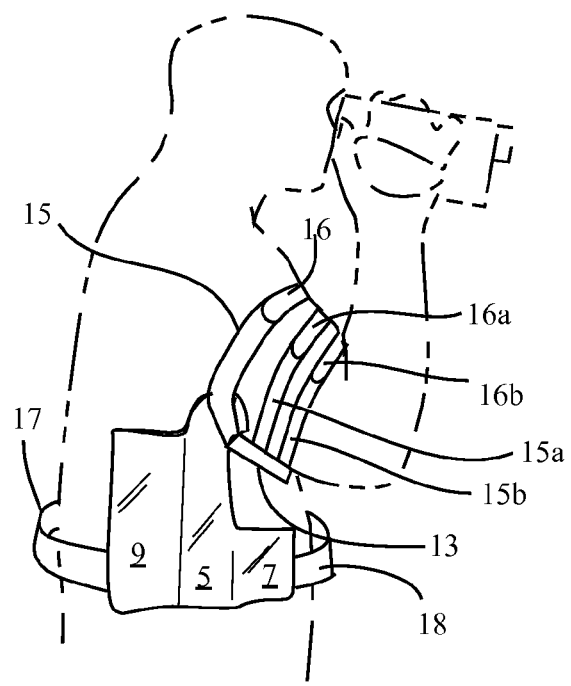
FIG. 6—depicts an exemplary implementation of the support apparatus.
Figure 7:
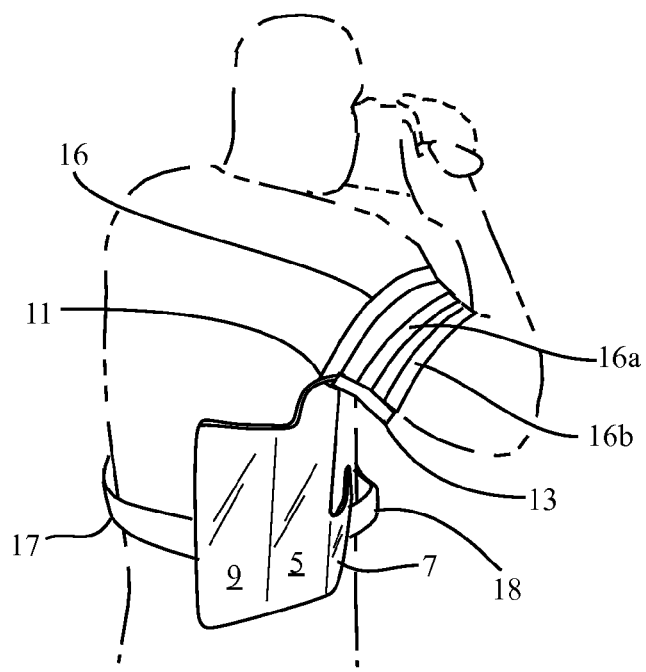
FIG. 7—depicts another exemplary implementation of the support apparatus.

The support apparatus is very simple to use. Referring to FIGS. 6 and 7, the videographer simply places the support apparatus, with the front panel 7 disposed against the anterior portion of the videographer's torso. The support apparatus is then moved to a comfortable position on a side of his or her torso, generally the dominant hand side; where the front panel 7 is generally resting against the anterior of the videographer's torso, and the back panel 9 is resting against the posterior of the videographer's torso.

The videographer then rests his or her upper arm upon the underarm support 13. The videographer then encircles his or her arm with the straps 13 to limit arm motion. In embodiments, having one or more torso straps 17, 18 the videographer laterally encircles his or herself with the torso straps 17, 18 to further stabilize the support apparatus against his or her torso. Where necessary, the arm band straps 15, 16 are then secured circumferentially about the upper arm of the videographer or photographer, which provides further stabilization against unintended movement and arm fatigue. Multiple straps may be provided 15, 15a, 15b, 16, 16a, 16b as was depicted in FIGS. 6 and 7 to accommodate a wide range of arm circumferences and lengths. The arm straps 15, 15a, 15b, 16, 16a, 16b may be secured together with hook and loop type fasteners (e.g., Velcro (™)), a snap together male/female buckle, snaps, magnetic fasteners or a traditional buckle. The camcorder may then be held in the hand of the videographer maintained by the support apparatus for an extended period of time.

Figure 8:
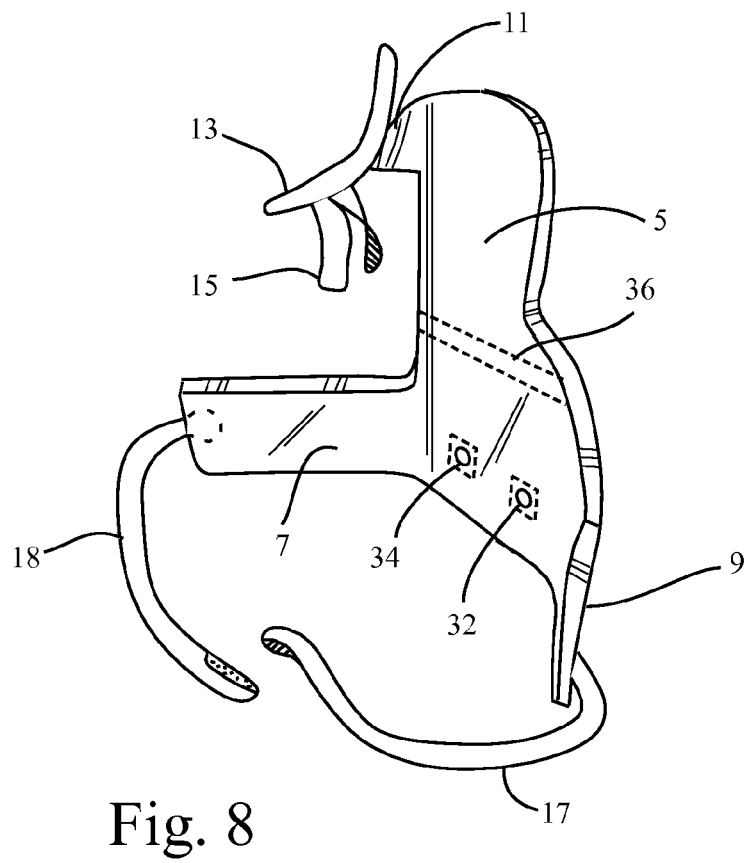
FIG. 8—depicts another perspective view of an embodiment of the support apparatus.
Figure 9:
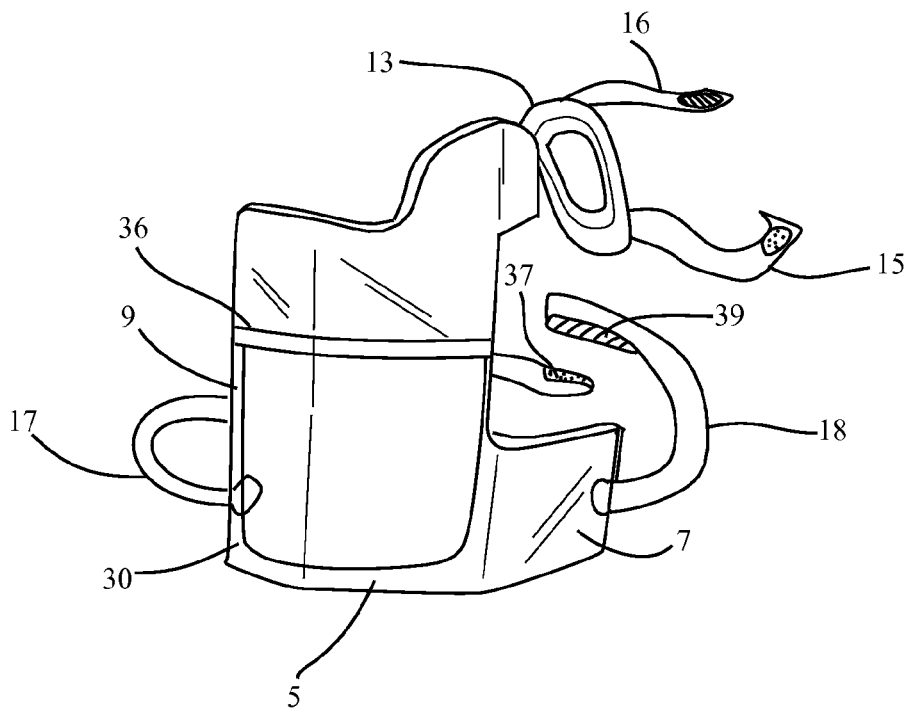
FIG. 9—depicts another rear view of an embodiment of the support apparatus.

Referring to FIGS. 8 and 9 another exemplary embodiment of the support apparatus is depicted. In this exemplary embodiment, a pair of lateral support straps 17, 18 is provided to secure the support apparatus circumferentially about a waist of the videographer or photographer. The straps 17, 18 may be secured together with hook and loop type fasteners (e.g., Velcro (™)), a snap together male/female buckle, snaps, magnetic fasteners or a traditional buckle. The underarm support 13 is provided with at least a pair of straps 15, 16 which are used to secure the upper part of the arm to the underarm support 13.

A pair of snaps 32, 34 may be provided to secure a pocket 30 or similar flexible storage compartment to the support apparatus. In an embodiment, the pocket includes a hook and loop type fastener 36 to attach the top of the pocket to the support apparatus and also to close the pocket 30 to prevent its contents from falling out. The pocket may be used to hold extra camera batteries, lens caps, video storage media, the camera itself and like devices.

The various exemplary embodiments described herein are merely illustrative of the principles underlying the inventive concept. It is therefore contemplated that various modifications of the disclosed exemplary embodiments will, without departing from the spirit and scope of the various exemplary invention embodiments will be apparent to persons of ordinary skill in the art. In particular, it is contemplated that functional implementation of the various exemplary embodiments described herein may be implemented using various polymeric materials and manufacturing methods.

What is claimed:

1. A support apparatus for minimizing arm fatigue of a videographer comprising:
   a main panel dimensioned to laterally encompass a portion of a torso of the videographer;
   an arm support bridge being contiguous with the main panel and projecting laterally outward from the main panel in a plane generally perpendicular to the main panel; the arm support bridge including;
   a downward sloping underarm support contiguous with the arm support bridge and aligned at an acute angle relative to the main panel, such that an arm of the videographer is positioned anterior of the main panel when disposed upon the underarm support;
   wherein the underarm support is cantilevered from the main panel with the arm support bridge.

2. The support apparatus according to claim 1 wherein the underarm support includes a concave cross sectional profile which generally conforms to a contour of a portion of the videographer's upper arm to be supported thereon.

3. The support apparatus according to claim 1 wherein the underarm support includes at least one strap to circumferentially maintain a portion of the videographer's upper arm in a generally parallel alignment with a long axis of the underarm support.

4. The support apparatus according to claim 1 wherein the main panel further includes an anterior projecting front panel contiguous with the main panel at least along a bottom edge and aligned at an acute angle relative to the torso of the videographer.

5. The support apparatus according to claim 1 wherein at least the main panel is formed from a generally planar polymeric sheet.

6. The support apparatus according to claim 1 wherein the underarm support is aligned such that a portion of the videographer's upper arm rests generally upon and in parallel with a long dimension of the underarm support in a generally anterior position relative to the torso of the videographer.

7. The support apparatus according to claim 1 wherein the underarm support is laterally offset from the longitudinal centerline of the main panel.

8. The support apparatus according to claim 1 further including means for maintaining a portion of the videographer's upper arm in a generally parallel alignment with a long axis of the underarm support.

9. The support apparatus according to claim 1 further including means for laterally securing the support apparatus circumferentially about a waist of the videographer.

10. A method for using the apparatus of claim 1 comprising:
    positioning a main panel about a lateral surface of the videographer's torso such that an arm support bridge contiguous with an upper edge of the main panel is positioned anterior of a longitudinal centerline of the main panel;
    placing a portion of the videographer's upper arm in a generally parallel alignment with a long axis of an underarm support, such that the videographer's upper arm projecting laterally outward from the main panel in a plane generally perpendicular to the main panel; and,
    maintaining the portion of the videographer's upper arm in the generally parallel alignment with the long axis of the underarm support by circumferentially placing one or more straps about the videographer's upper arm.

11. The method according to claim 10 further including adjusting the position of the main panel to allow video recording for an extended time period when the videographer's upper arm is circumferentially maintained upon the underarm support.

12. A method for using the apparatus of claim 1 comprising:
    providing a main panel having a hyoid contour sufficient to laterally encompass a portion of a torso of the videographer;
    providing an arm support bridge contiguous with an upper edge of the main panel projecting laterally outward from the main panel in a plane generally perpendicular to the main panel; and,
    providing a downward sloping underarm support contiguous with the arm support bridge aligned at an acute angle relative to the main panel and disposed predominately anterior of a longitudinal centerline of the main panel, such that an arm of the videographer is positioned anterior of the main panel when disposed upon the underarm support.

13. The method according to claim 12 further including providing the underarm support with a concave cross sectional profile which generally conforms to a contour of a portion of the videographer's upper arm to be supported thereon.

14. The method according to claim 12 further including providing the arm support bridge with at least one strap to circumferentially maintain a portion of the videographer's upper arm in a generally parallel alignment with a long axis of the underarm support.

15. The method according to claim 12 further including aligning the underarm support such that a portion of the videographer's upper arm rests generally upon and in parallel with a long dimension of the underarm support in a generally anterior position relative to the torso of the videographer.

16. The method according to claim 12 further including providing means for maintaining a portion of the videographer's upper arm in a generally parallel alignment with a long axis of the underarm support.

17. The method according to claim 16 wherein the means for maintaining the portion of the videographer's upper arm is at least one strap.

18. The method according to claim 12 further including laterally securing the support apparatus circumferentially about a waist of the videographer with at least one strap.

19. A support apparatus for minimizing arm fatigue of a videographer comprising:
    a main panel dimensioned to span a substantial longitudinal portion of a torso extending between an underside of an arm and a hip of the videographer;
    an arm support bridge contiguous with the main panel which projects anteriorly from the main panel in a plane generally perpendicular to the main panel, the arm support bridge including;
    a downward sloping underarm support contiguous with the arm support bridge aligned at an acute angle relative to the main panel and disposed anterior of a longitudinal centerline of the main panel and laterally offset from the main panel, such that an arm of the videographer is positioned anterior of the main panel when the arm is disposed upon the underarm support; and,
    wherein the underarm support is cantilevered at the acute angle from the main panel with the arm support bridge.

20. The support apparatus according to claim 19 further including a front panel which projects anteriorly from one side of the main panel, a rear panel which projects anteriorly from an opposite side of the main panel relative to the front panel.

21. The support apparatus according to claim 20 wherein the main panel, front panel and rear panel form a hyoid shaped member dimensioned to circumferentially encompass an anterior, posterior and a side portion of the torso proximate to a waist of the videographer.

22. The support apparatus according to claim 20 wherein the main panel, front and rear panels consist of a unitary polymeric material formed into the hyoid shaped member.

* * * * *